April 29, 1952      J. KONSEL      2,594,451
ADJUSTABLE HANDLE BAR
Filed July 17, 1946      2 SHEETS—SHEET 1
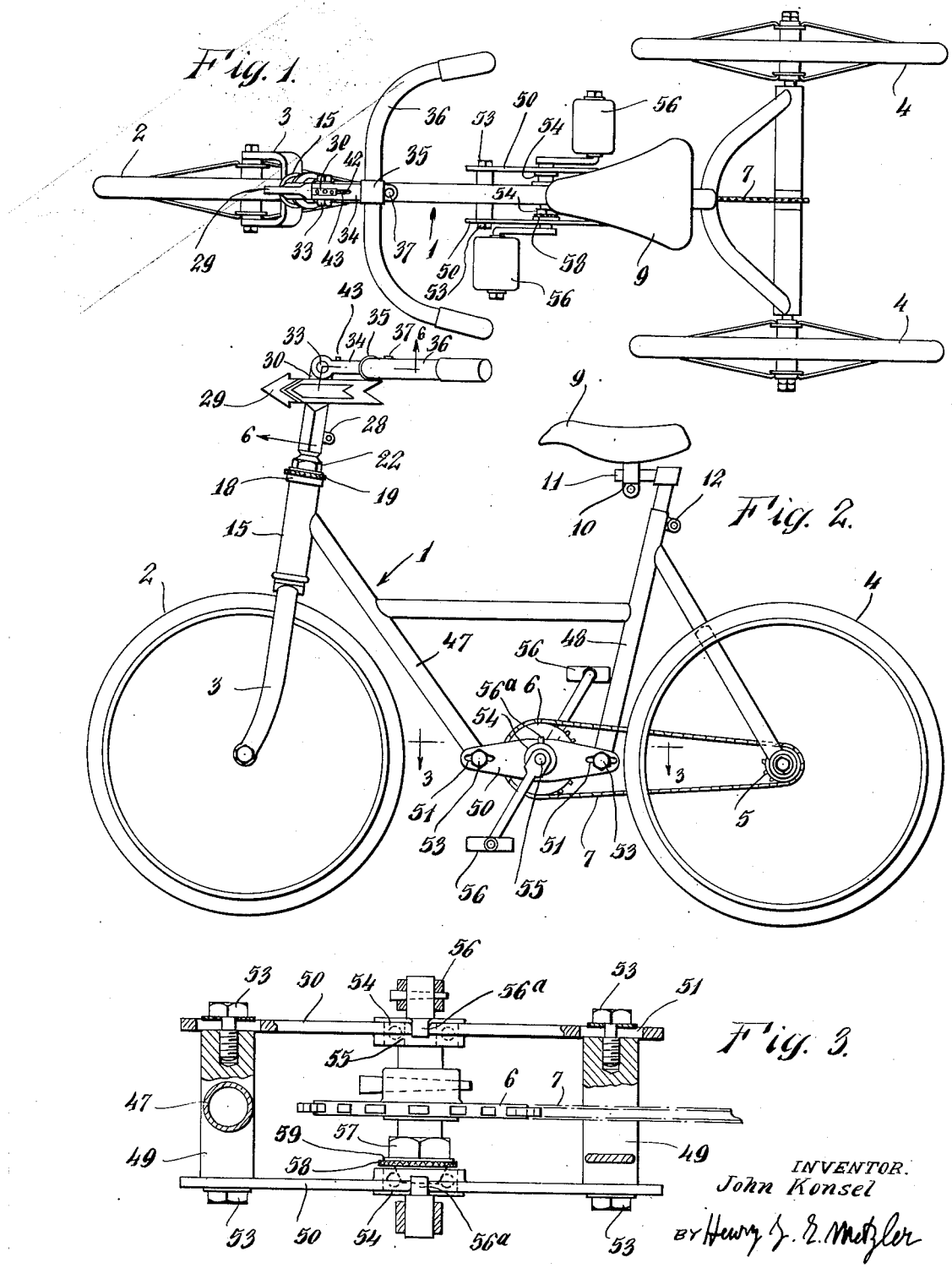

April 29, 1952     J. KONSEL     2,594,451
ADJUSTABLE HANDLE BAR
Filed July 17, 1946     2 SHEETS—SHEET 2
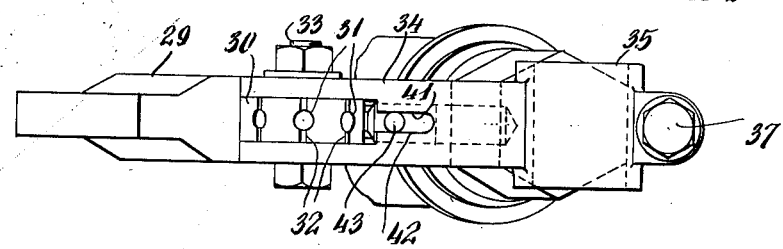
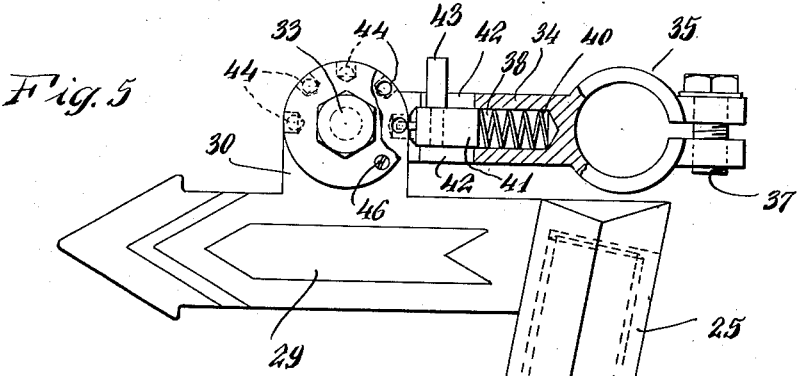
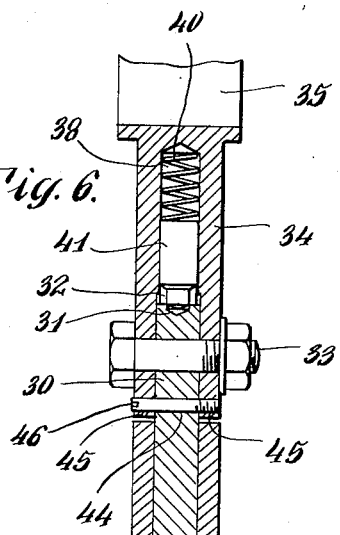
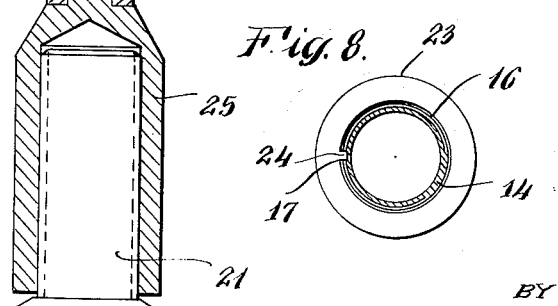
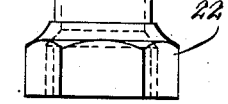
INVENTOR.
John Konsel Patented Apr. 29, 1952

2,594,451

UNITED STATES PATENT OFFICE 2,594,451

ADJUSTABLE HANDLE BAR

John Konsel, Massapequa, N. Y.

Application July 17, 1946, Serial No. 684,155

1 Claim. (Cl. 74—551.3)

This invention relates to an improvement in velocipedes such as tricycles and bicycles.

When such vehicles are bought for small children they are quickly outgrown and, as usually constructed, they must be discarded long before they are outworn. It is customary to provide means for raising the seat and for raising the handle bar and within limited amount to move the seat forward or back. The amount of such adjustment is, however, inadequate for the purpose because it spoils the relationship between the seat and the pedals and between the pedals and the handle bars.

It is an object of this invention to provide means in which the handle bars may be adjusted toward and from the seat, and in any position the handle bars may be adjusted angularly for the convenience of the rider.

It is a further object to provide a construction by which the pedals may be adjusted relative to the seat and handle bars.

Another object of the present invention is the provision of a device of the character described which has a handle bar that is adjustable in a very simple manner so that the distance between the handles and the saddle of a bicycle or tricycle can be varied widely according to the size of the rider, so that any person can ride the velocipede without uncomfort and without getting blisters on the hands. The height of the saddle is adjustable on almost all bicycles or tricycles to fit the length of the rider's legs. However, the well-known saddle adjustment alone is insufficient for affording a convenient riding of one vehicle by persons of various sizes. But if the handle bar as well as the saddle is adjustable, one and the same vehicle can be adjusted for convenient use by persons of different sizes, or a vehicle of a growing child can be adjusted from time to time so that for many years it will fit perfectly its owner although the length of his arms and legs increases progressively as he is growing up.

Still another object of the present invention is the provision of a device of the character described which is provided with means for facilitating the adjustment of the handle bar in such a manner that the position of the handle bar can be changed almost instantly without the use of any tools and without the application of any considerable amount of skill; this allows a rider to change quickly his handle bar from a so-called "touring position" (allowing a substantially upright sitting on the saddle) to a so-called "racing position" in which he lays practically in a horizontal position on the vehicle for the purpose of reducing the air resistance to a minimum.

Yet a further object of the present invention is the provision of a device of the character described which particularly if employed for tricycles, provides for a horizontally adjustable new and improved bearings support of the pedal actuated crankshaft, so that the tension of the chain which connects said crank-shaft to the driving wheels, as well as the crank-shaft bearings, can be adjusted in a very simple manner.

With the foregoing and other objects in view which will appear as the description proceeds, the invention consists of certain novel details of construction and combinations of parts hereinafter more fully described and pointed out in the claim, it being understood that changes may be made in the construction and arrangement of parts without departing from the spirit of the invention as claimed.

In the accompanying drawings the preferred forms of the invention have been shown.

In said drawings:

Figure 1 is a top plan view of a tricycle which is provided with all the new improvements of my invention;

Figure 2 is a side elevation of said tricycle;

Figure 3 is an enlarged fractional sectional view on the line 3—3 of Figure 2;

Figure 4 is an enlarged plan view of my new and improved handlebar support which can be used for tricycles as well as for bicycles;

Figure 5 is a side elevation of the handlebar support of Figures 4;

Figure 6 is a longitudinal enlarged fractional sectional view on the line 6—6 of Figure 2;

Figure 7 is a side elevation of a detail which will be explained hereinafter; and Figure 8 is a cross-sectional view on the line 8—8 of Figure 5.

Similar reference characters refer to similar parts throughout the several views.

In the drawings the numeral 1 denotes the frame of a tricycle having a front wheel 2, a front wheel fork 3, rear wheels 4, sprocket wheels 5 and 6, a chain 7, pedals 8, and a saddle 9 which is adjustable at 10 on a saddle bracket 11 that is itself adjustable at 12 in a well known manner.

The fork 3 is secured to the tube 14 (Figure 5) which extends through the steering fork housing 15 and is provided at its upper portion with an external thread 16 and a vertical groove 17 (Figure 8). A collar member 18 is provided at the upper extremity of the fork housing 15, and a ring 19 having a knurled outer periphery and a reduced conical lower portion as well as an internal thread is screwed upon the tube 14. Bearing balls 20 are interposed between the member 18 and the conical portion of the ring 19. A cylinder 21 which preferably is formed as a unit with a nut 22 (Figure 7) is screwed upon the upper section of the threaded portion 16 of tube 14, and a washer 23 is interposed between the ring 19 and the nut 22. The washer 23 is provided with an inwardly protruding tongue 24, which engages the groove 17 previously referred to, as may be seen in Figure 8, so that the washer 23 cannot be rotated relatively to the part 14. The lower portion of the tube 14 is supported by bearings (not shown) in the usual manner. The arrangement of the parts 18 to 23 as illustrated and described above affords a very handy and convenient means for proper adjustment of the fork supporting bearings, and these parts can be retained after adjustment in the proper position by tightening the nut 22.

The cylinder 21 is extended into a longitudinally slotted tubular member 25 which is firmly secured thereto by tightening a screw 27 that is extended through the lugs 28. A horizontal bar 29, which is preferably shaped as an arrow is secured to or formed as a unit with the member 25 either in the manner shown in Figures 1 and 2 or in that shown in Figures 4 and 5. A lug 30 extends over the upper side of the bar 29 and is provided at its periphery with a row of bores, or slots or with a row of openings which are combinations of bores 31 and slots 32 as in the instance shown. A bolt 33 is extended through the lug 30 as well as through the bifurcated portion of a bracket 34, which is provided with a slotted lug-shaped portion 35 in which the handle bar 36 is held firmly by tightening a screw 37. The main portion of the bracket 34 is provided with a cylindrical bore 38 which contains a spring 40 and a shiftable pin 41 whose outer extremity is shaped in such a manner that it fits into the bores 31 and/or the slots 32. Said main portion of the bracket 34 is also provided with slots 42 through which extends a cross-pin 43 which is radially secured to the pin 41. By pushing the cross-pin 43 toward the lug-shaped portion 35, the pin 41 is brought out of engagement with the bores 31 and/or the slots 32, so that the pin 41 will no longer prevent a swinging of the bracket 34 around the bolt 33. Thus the parts 30 to 43 constitute a simple locking mechanism which will retain the parts 34 and 36 in any suitable angular position relative to the parts 14 to 30. If a bicycle or a tricycle is given to a child it may be desirable to prevent him from tampering constantly with the adjustable handle bar. In this case I prefer to provide the lug 30 with a circular row of cross bores 44 and also to provide the bifurcated portion of the bracket 34 with registering bores 45, one of which is threaded, so that a locking bolt 46 can be extended through the bores 45 and one of the cross-bores 44 after the proper angular adjustment of the bracket 34, as may be seen in Figure 6. The bracket 34 may, for instance, first be secured in the position shown in Figure 5; when the child has grown, the bracket 34 may be maintained in a more vertical position (not shown) and in this way the parts 34 and 36 can be maintained always in a position which is most convenient for the user of the vehicle.

In the case of a tricycle (Figures 1 to 3) I prefer to secure to the lower extremity of each frame member 47 and 48 a cross bar 49, and plates 50, which are provided with slots 51, are secured to the cross bars 49, as shown in Figures 2 and 3, by means of screws 53. Bearings 54 for the crank shaft 55, which is actuated by pedals 56 and which carries the sprocket wheel 6, are secured to the center portions of the plates 50 through which said shaft 55 is extended. I prefer to provide the casings of the bearings 54 with tongues 56a which are bent over the edges of the plates 50, thus covering the outer side of said bearings by very simple means. A locknut 57 and a knurled conical ring 58 with a washer 59 therebetween is preferably arranged between one of the bearings 54 and the wheel 6 in substantially the same manner as the parts 18 to 22 previously referred to.

After loosening of the screws 53 the plates 50 can be adjusted easily on the parts 49 for the purpose of imparting the proper tension to the chain 7.

Since certain changes may be made in the above article and different embodiments of the invention could be made without departing from the scope thereof, it is intended that all matter contained in the above description or shown in the accompanying drawings shall be interpreted as illustrative and not in a limiting sense.

It is also to be understood that the following claim is intended to cover all of the generic and specific features of the invention herein described, and all statements of the scope of the invention which as a matter of language might be said to fall therebetween.

Having thus fully described my said invention, what I claim as new and desire to secure by Letters Patent is:

A steering mechanism, a vertical member attachable to the upper end of a fork of a bicycle or the like, a link pivoted to said vertical member about an axis such as would be horizontal and transverse to the direction of motion of a vehicle to which the device may be attached, means to lock said pivot at any desired angle between the link and the member, a pair of handle bars pivoted to said link about an axis spaced from and parallel to said first mentioned axis and means for fastening said pivotal connection against movement about its axis, said locking means comprising a drum on said vertical member having circumferentially spaced openings and a movable pin slidable on said link in position to enter one of said openings to lock said link to said vertical member independent of fastening means and a button operable in a slot in said link and connected to said pin for manually operating the pin.

JOHN KONSEL.

REFERENCES CITED

The following references are of record in the file of this patent:

UNITED STATES PATENTS

| Number | Name | Date |
|---|---|---|
| 426,670 | Keating | Apr. 29, 1890 |
| 499,109 | Harriott | June 6, 1893 |
| 561,329 | Leonard | June 2, 1896 |
| 671,647 | Field | Apr. 9, 1901 |

FOREIGN PATENTS

| Number | Country | Date |
|---|---|---|
| 17,622 | Great Britain | Oct. 15, 1891 |
| 28,365 | Great Britain | 1897 |
| 6,835 of 1898 | Great Britain | Feb. 4, 1899 |
| 468,848 | France | May 5, 1914 |
| 867,249 | France | July 15, 1941 |